(12) United States Patent
Mathis

(10) Patent No.: US 11,767,863 B1
(45) Date of Patent: Sep. 26, 2023

(54) ORBICULAR VALVULAR CONDUIT

(71) Applicant: Joshua Jordan Mathis, Ft. Jones, CA (US)

(72) Inventor: Joshua Jordan Mathis, Ft. Jones, CA (US)

( * ) Notice: Subject to any disclaimer, the term of this patent is extended or adjusted under 35 U.S.C. 154(b) by 91 days.

(21) Appl. No.: 17/529,774

(22) Filed: Nov. 18, 2021

Related U.S. Application Data

(60) Provisional application No. 63/247,057, filed on Sep. 22, 2021.

(51) Int. Cl.
  *F15D 1/02* (2006.01)
  *F16L 9/19* (2006.01)

(52) U.S. Cl.
  CPC ............... *F15D 1/025* (2013.01); *F16L 9/19* (2013.01)

(58) Field of Classification Search
  CPC .................................. F15D 1/025; F16L 9/19
  USPC ............................................................ 138/89
  See application file for complete search history.

(56) References Cited

U.S. PATENT DOCUMENTS

| | | | | |
|---|---|---|---|---|
| 1,329,559 A | * | 2/1920 | Tesla | F15D 1/02 137/842 |
| 2,727,535 A | | 1/1950 | Linderoth | |
| 3,312,249 A | | 4/1967 | Cadiou | |
| 5,265,636 A | * | 11/1993 | Reed | F15C 1/146 137/833 |
| 9,169,855 B1 | * | 10/2015 | Dyson | F15C 5/00 |
| 9,695,654 B2 | | 6/2017 | Stephenson et al. | |
| 9,739,296 B2 | | 8/2017 | Schlosser | |
| 9,903,536 B2 | | 2/2018 | Lin et al. | |
| 9,915,362 B2 | * | 3/2018 | Hampton | F16K 99/0057 |
| 10,245,586 B2 | | 4/2019 | Gilbert et al. | |
| 10,299,636 B2 | | 5/2019 | Ophardt et al. | |
| 10,612,447 B2 | | 4/2020 | Suchezky et al. | |
| 11,047,249 B2 | | 6/2021 | Schwedenmann | |
| 11,060,636 B2 | | 7/2021 | Dalmas et al. | |

(Continued)

*Primary Examiner* — Craig M Schneider
*Assistant Examiner* — David R Deal
(74) *Attorney, Agent, or Firm* — Jerry Haynes Law

(57) ABSTRACT

An orbicular valvular conduit which has no moving parts and is configured to facilitate unidirectional flow of a primary fluid stream by utilizing a counterflowing diverted fluid stream to counteract any opposing fluid stream which flows in the direction opposite the primary fluid stream may include at least one conduit subunit. Each conduit subunit may include a fluid diverging section. A fluid converging section may extend from the fluid diverging section. A valve core may be disposed in the fluid diverging section and the fluid converging section. A primary flow passage may extend through the valve core to accommodate a primary fluid stream. A secondary core passage may be formed by and between the valve core and the fluid diverging section and the fluid converging section. In the event that an opposing fluid stream develops in the primary flow passage in the direction opposite the primary fluid stream, the secondary core passage may accommodate a diverted fluid stream which reenters the primary fluid stream to oppose or impede the opposing fluid stream. The fluid converging section of each conduit subunit may be joined to the fluid diverging section of an adjacent conduit subunit along a section interface. The orbicular valvular conduit may be fabricated using machining, stamping or 3D printing techniques.

21 Claims, 11 Drawing Sheets

(56) References Cited

U.S. PATENT DOCUMENTS

| | | |
|---|---|---|
| 2015/0059718 A1 | 3/2015 | Claywell et al. |
| 2019/0039066 A1* | 2/2019 | Gilbert .............. B01L 3/502715 |
| 2019/0101089 A1* | 4/2019 | Dalmas, II ......... F02M 63/0078 |
| 2019/0360495 A1* | 11/2019 | Don ........................ F15D 1/001 |
| 2021/0238939 A1* | 8/2021 | Stolboushkin .......... E21B 43/12 |
| 2021/0254435 A1* | 8/2021 | Zhu ........................ E21B 43/12 |

* cited by examiner

ORBICULAR VALVULAR CONDUIT

CROSS-REFERENCE TO RELATED APPLICATIONS

This application claims the benefit of U.S. provisional application No. 63/247,057, filed Sep. 22, 2021, and entitled "ORBICULAR VALVULAR CONDUIT", which provisional application is hereby incorporated by reference herein in its entirety.

FIELD OF THE INVENTION

The present invention relates generally to unidirectional valves. More so, the present invention relates to an orbicular valvular conduit which has no moving parts and is configured to facilitate unidirectional flow of a primary fluid stream by utilizing a counterflowing diverted fluid stream to counteract any opposing fluid stream which flows in the direction opposite the primary fluid stream.

SUMMARY OF THE INVENTION

Illustrative embodiments of the disclosure are generally directed to an orbicular valvular conduit which has no moving parts and is configured to facilitate unidirectional flow of a primary fluid stream by utilizing a counterflowing diverted fluid stream to counteract any opposing fluid stream which flows in the direction opposite the primary fluid stream. An illustrative embodiment of the orbicular valvular conduit may include at least one conduit subunit. Each conduit subunit may include a fluid diverging section. A fluid converging section may extend from the fluid diverging section. A valve core may be disposed in the fluid diverging section and the fluid converging section. A primary flow passage may extend through the valve core to accommodate a primary fluid stream. A secondary core passage may be formed by and between the valve core and the fluid diverging section and the fluid converging section. In the event that an opposing fluid stream develops in the primary flow passage in the direction opposite the primary fluid stream, the secondary core passage may accommodate a diverted fluid stream which reenters the primary fluid stream to oppose or impede the opposing fluid stream. The fluid converging section of each conduit subunit may be joined to the fluid diverging section of an adjacent conduit subunit along a section interface. The orbicular valvular conduit may be fabricated using machining, stamping or 3D printing techniques.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1:
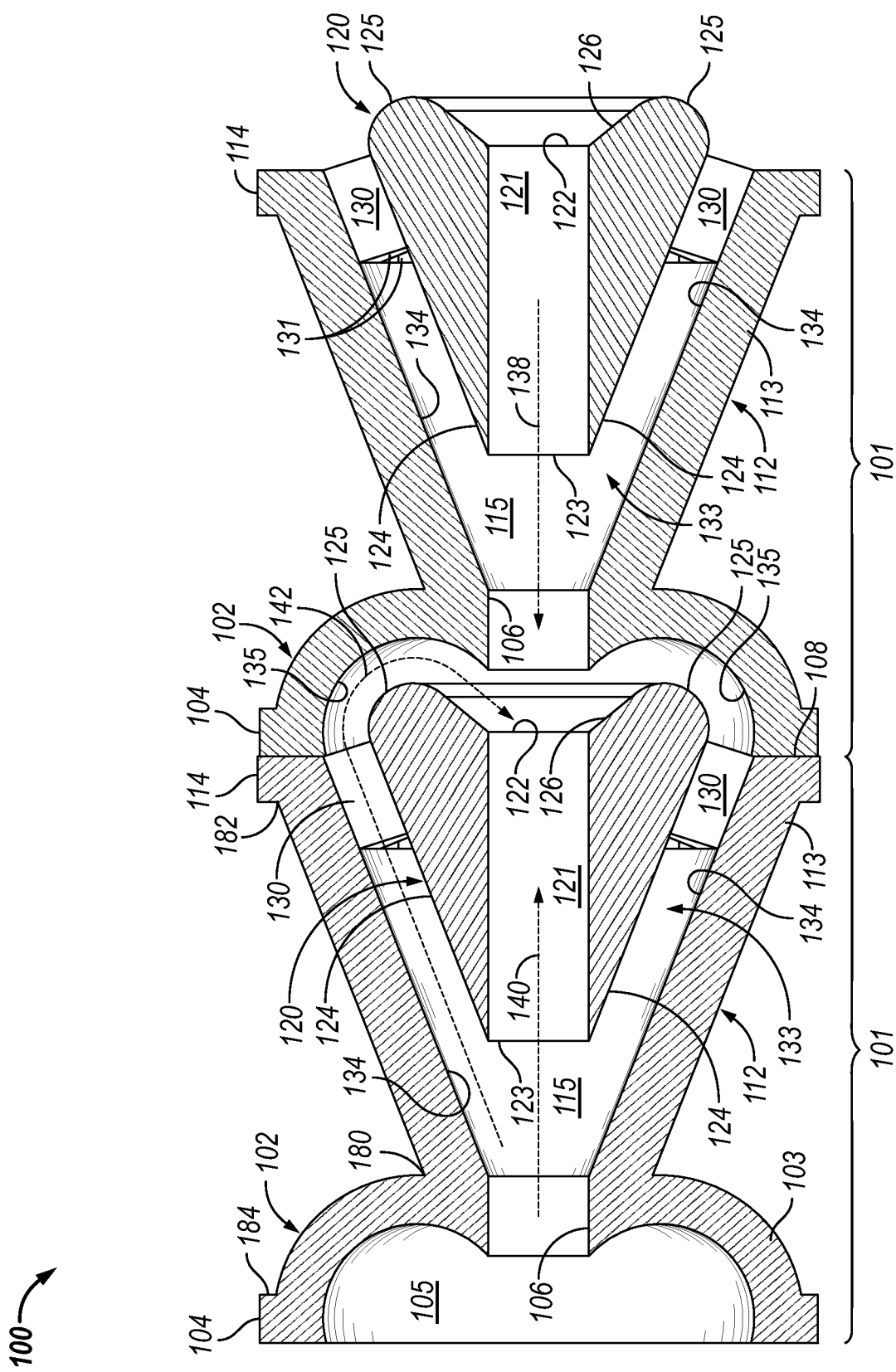
FIG. 1 is a longitudinal sectional view of an illustrative embodiment of a machined orbicular valvular conduit with a 180° cutaway, with a pair of conduit subunits connected to each other and more particularly illustrating typical flow paths for a primary fluid stream, an opposing fluid stream and a counterflowing diverted fluid stream in the conduit.
Figure 2:
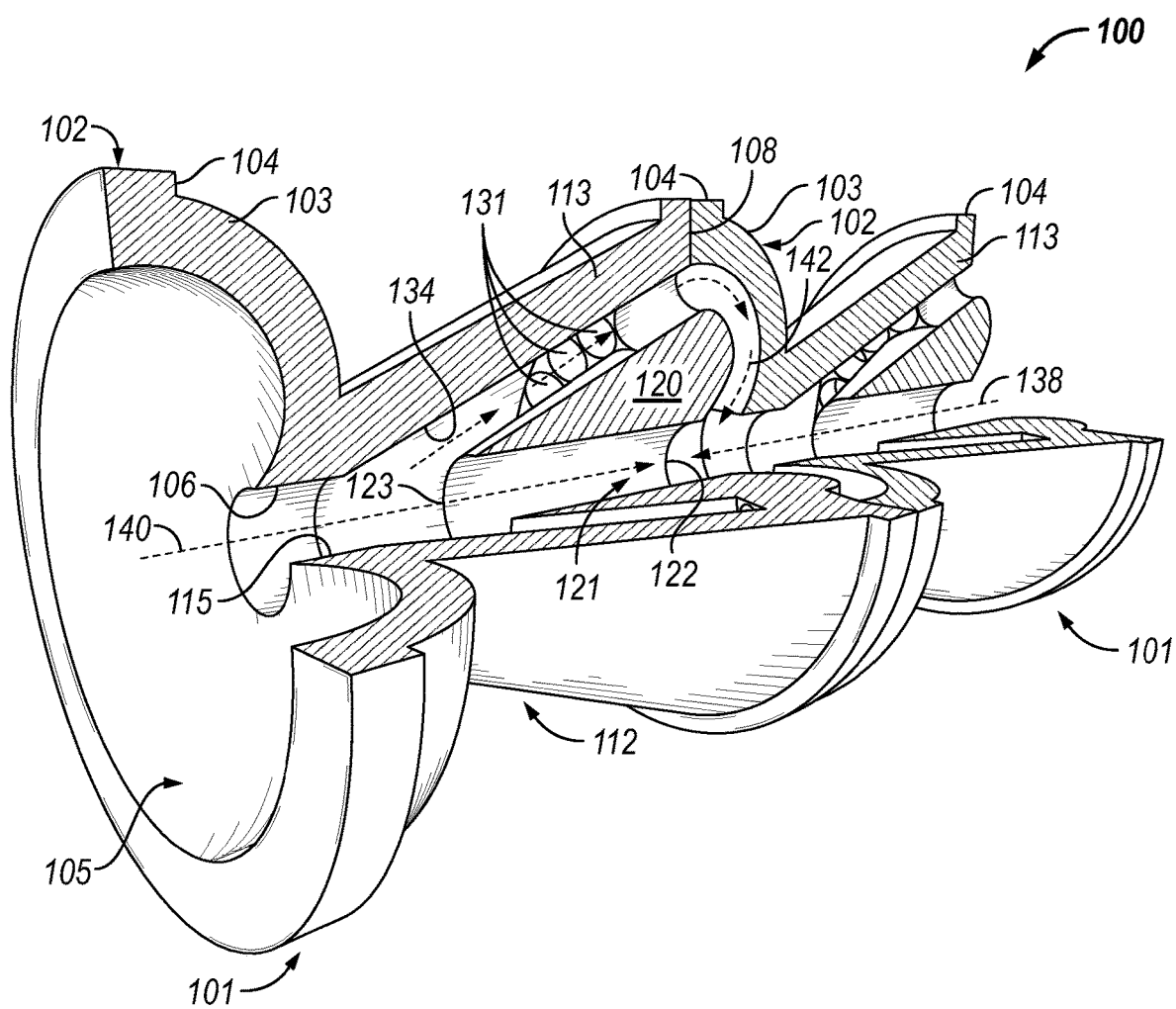
FIG. 2 is a sectioned perspective view of the machined orbicular valvular conduit illustrated in FIG. 1, with a 90° cutaway.

An illustrative embodiment of an orbicular valvular conduit 100 is referenced in FIGS. 1 and 2. The orbicular valvular conduit 100, hereafter "conduit 100", may have no moving parts and is configured to facilitate unidirectional flow of a primary fluid stream 138 by utilizing a counterflowing diverted fluid stream 142 to counteract any opposing fluid stream 140 which flows in the direction opposite the primary fluid stream 138. The conduit 100 may be configured for coupling to a pipe or other fluid flow conduit (not illustrated) which conveys water, air, gas, or other fluid. The conduit 100 may include at least two conduit subunits 102. Any number of the conduit subunits 102 may be combined to form the conduit 100, depending on the application.

Each conduit subunit 101 of the conduit 100 may include a fluid converging section 102. The fluid converging section 102 may have a concave or bowl-shaped converging section wall 103. A converging section interior 105 may be formed by the converging section wall 103. A converging section flange 104 may be provided along the outer edge or rim of the converging section wall 103. A converging section opening 106 may extend through the converging section wall 103 at substantially the center of the fluid converging section 102. The converging section opening 106 may communicate with the converging section interior 105.

A fluid diverging section 112 may extend from the fluid converging section 102. The fluid diverging section 112 may have a conical diverging section wall 113 which extends from the converging section wall 103 of the fluid converging section 102. A diverging section interior 115 may be formed by the diverging section wall 113. The diverging section interior 115 of the fluid diverging section 112 may communicate with the converging section interior 105 of the fluid converging section 102 through the converging section opening 106. A diverging section flange 114 may be provided along the outer edge or rim of the diverging section wall 113. The diverging section flange 113 on the fluid diverging section 112 may be configured to mate with the companion converging section flange 114 on the fluid converging section 102 of an adjacent conduit subunit 101 at a section interface 108 to couple the conduit subunits 101 to each other in the conduit 100.

A conical valve core 120 may be disposed in the diverging section interior 115 of the fluid diverging section 112. A primary flow passage 121 may extend centrally through the valve core 120. The primary flow passage 121 may have a passage inlet end 122 and a passage outlet end 123. The passage outlet end 123 of the primary flow passage 121 may be disposed proximate the converging section opening 106 of the fluid converging section 102. A fluid diverting surface 124 may extend outwardly from the passage outlet end 123 of the primary flow passage 121. A fluid converging surface 125, having a curved profile in cross-section, may extend from the fluid diverging surface 124. An annular passage inlet cavity 126 may extend from the fluid converging surface 125 and terminate at the passage inlet end 122 of the primary flow passage 121.

A conical secondary flow passage 133 may be formed by and between the diverging section wall 113 of the fluid diverging section 112 and the fluid diverting surface 124 of the valve core 120. The secondary flow passage 133 may have a diverging passage segment 134 which extends along the fluid diverging surface 124 and a converging passage segment 135 which extends along the fluid converging surface 125. The primary flow passage 121 of the valve core 120 may be disposed in fluid communication with the converging passage segment 135 of the secondary flow passage 133 through the passage inlet cavity 126. At least one guide 130 may be disposed in the secondary flow passage 133. As illustrated in FIG. 2, at least one guide passage 131 may extend through the guide 130. The guide passage 131 may establish fluid communication between the converging passage segment 135 and the diverging passage segment 134 of the secondary flow passage 133.

In typical application, the conduit 100 may be assembled by stacking, coupling, or connecting a selected number of the adjacent conduit subunits 101 to form the conduit 100. Accordingly, the converging section flange 104 on the fluid converging section 102 of one conduit subunit 101 may be connected to the companion interfacing diverging section flange 114 on the adjacent fluid diverging section 112. This may be accomplished by welding, mechanical fasteners and/or other suitable attachment or coupling technique which is suitable for the purpose. As the converging section flange 104 is placed into engagement with the diverging section flange 114, the converging passage segment 135 of the secondary flow passage 133 may be formed by the fluid converging surface 125 of the valve core 120 and the interior surface of the converging section interior 105 of the fluid converging section 102.

As the fluid liquid or gas flows through the conduit 100, the primary flow passage 121 allows flow of the primary fluid stream 138 in one direction as the fluid flows through the valve core 120, the diverging section interior 115 of the fluid diverging section 112, the converging section opening 106 and the converging section interior 105 of the fluid converging section 102, respectively. In the event that the fluid flows backwards as the opposing fluid stream 140, at least a portion of the fluid may flow through the secondary flow passage 133 as the diverted fluid stream 142. The diverted fluid stream 142 may thus flow through the diverging passage segment 134 of the secondary flow passage 133, the guide passage or passages 131 in the guide 130, the converging passage segment 135 of the secondary flow passage 133, the passage inlet cavity 126 and the passage inlet end 122, respectively, of the primary flow passage 121. Accordingly, the diverted fluid stream 142 resists or limits flow of the opposing fluid stream 140 in the opposite direction through the primary flow passage 121. The fluids or gases in the diverted fluid stream 142 thus diverge from the opposing fluid stream 140 and travel the diverging passage segment 134 for a length and then curve or angle back through the converging passage segment 135 to the primary flow passage 121 and join the primary fluid stream 138, wherein the primary fluid stream 138 and the diverted fluid stream 142 oppose or impede the opposing fluid stream 140 in the primary flow passage 121.

On either side of the secondary flow passage 133 are sections of material. Because the orbicular configuration of the fluid converging section 102 and the fluid diverging section 112, if the secondary flow passage 133 continued unimpeded, the inner section of material of the valve core 120 would not connect to the outer piece of material of the diverging section wall 113. Accordingly, the guide 130 may connect the inner section of material which forms the valve core 120 and the outer section of material which forms the diverging section wall 113. The guide passages 131 (FIG. 2) in the guide 130 facilitate flow of the diverted fluid stream 142 through the secondary flow passage 133 while connecting the inner valve core 120 and the outer diverging section wall 113. As illustrated in FIG. 2, the guide passages 131 may be repeated around the circumference of the secondary flow passage 133. In some embodiments, the guide passages 131 may be repeated in regular intervals, following the arc of the secondary flow passage 133. The guide passages 131 may be any shape; however, the preferred embodiment would be circular or elongated holes, following the arc of the secondary flow passage 133. The combined volume of the guide passages 131 may be greater than that of the primary flow passage 121, making flow of the diverted fluid stream 142 through the secondary flow passage 133 more efficient than flow of the opposing fluid stream 140 in the primary flow passage 121.

In some embodiments, each conduit subunit 101 of the conduit 100 may be machined from a single piece of material. Each conduit subunit 101 may be identical and may be stacked or connected end to end at the section interfaces 108. When less opposing fluid restriction is needed, fewer conduit subunits 101 would need to be stacked or connected. When more opposing fluid restriction is needed, a larger number of the conduit subunits 101 would need to be stacked or connected.

In typical fabrication of the conduit 100, each conduit subunit 101 may be machined as appropriate. A crevice 180 between the fluid converging section 102 and the fluid diverging section 112, a crevice 182 between the diverging section wall 113 and the diverging section flange 114 and a crevice 184 between the converging section wall 103 and the converging section flange 104 may each be machined to sharp angles as shown, or a radius as desired. The converging section wall 103 of the fluid converging section 102 and the diverging section wall 113 of the fluid diverging section 112 may be machined to leave a wall as thick or as thin as needed. In applications in which the conduit 100 is to be mounted in a tube or opening (not illustrated), the converging section flange 104 and the diverging section flange 114 may serve as bearing surfaces.

In some embodiments, the converging section wall 103 of the fluid converging section 102, the diverging section wall 113 of the fluid diverging section 112 and the valve core 120 may be machined from the same piece of material. Any of a variety of materials or combination of materials can be used for the purpose. Some examples may include but are not limited to plastic, aluminum, stainless steel, and titanium. The particular application of the conduit 100 may determine the particular material or combination of materials to be used. The section interface 108 may be plain or may have an index ridge or index studs/holes, for example and without limitation.

In one aspect, shown in FIGS. 1 and 2, the conduit 100 comprises:
- at least one conduit subunit 101 including:
  - a fluid converging section 102 having a converging section wall 103, a converging section interior 105 formed by the converging section wall 103 and a converging section opening 106 extending through the converging section wall 103 and communicating with the converging section interior 105;
  - a fluid diverging section 112 having a conical diverging section wall 113 extending from the converging section wall 103 of the fluid converging section 102 and a diverging section interior 115 formed by the diverging section wall 113, the diverging section interior 115 communicating with the converging section interior 105 of the fluid converging section 102 through the converging section opening 106, the fluid diverging section 112 configured to mate with a fluid converging section 102 of an adjacent conduit subunit 101 at a section interface 108;
  - a conical valve core 120 disposed in the diverging section interior 115 of the fluid diverging section 112, the primary flow passage 121 extending centrally through the valve core 120, the primary flow passage 121 having a passage inlet end 122 and a passage outlet end 123, the passage outlet end 123 of the primary flow passage 121 disposed proximate the converging section opening 106 of the fluid converging section 102, a fluid diverting surface 124 extending outwardly from the passage outlet end 123 of the primary flow passage 121, a fluid converging surface 125 having a curved profile in cross-section and extending from the fluid diverging surface 124 and an annular passage inlet cavity 126 extending from the fluid converging surface 125 and terminating at the passage inlet end 122 of the primary flow passage 121;
  - a conical secondary flow passage 133 formed by and between the diverging section wall 113 of the fluid diverging section 112 and the fluid diverting surface 124 of the valve core 120, the secondary flow passage 133 having a diverging passage segment 134 extending along the fluid diverging surface 124 and a converging passage segment 135 extending along the fluid converging surface 125, the primary flow passage 121 of the valve core 120 disposed in fluid communication with the converging passage segment 135 of the secondary flow passage 133 through the passage inlet cavity 126; and
  - at least one guide 130 disposed in the secondary flow passage 133 and at least one guide passage 131 extending through the guide 130, the guide passage 131 establishing fluid communication between the converging passage segment 135 and the diverging passage segment 134 of the secondary flow passage 133.

In another aspect, each conduit subunit 101 of the conduit 100 may be machined from a single piece of material.

In another aspect, a converging section flange 104 may be provided along the outer edge or rim of the converging section wall 103. A diverging section flange 114 may be provided along the outer edge or rim of the diverging section wall 113. The diverging section flange 113 on the fluid diverging section 112 may be configured to mate with the companion converging section flange 114 on the fluid converging section 102 of an adjacent conduit subunit 101 at a section interface 108 to couple the conduit subunits 101 to each other in the conduit 100.

In another aspect, the converging section wall 103 of the fluid converging section 102, the diverging section wall 113 of the fluid diverging section 112 and the valve core 120 may be machined from the same piece of material.

In another aspect, the fluid converging section 102, the fluid diverging section 112 and the valve core 120 may be fabricated of plastic, aluminum, stainless steel and/or titanium.

In another aspect, the guide passages 131 in the guide 130 may be repeated in regular intervals and may follow the arc of the secondary flow passage 133.

In another aspect, the guide passages 131 may be circular or elongated holes.

In another aspect, the combined volume of the guide passages 131 in the guide 130 may be greater than that of the primary flow passage 121.

One objective of the present invention is to provide an orbicular valvular conduit which is capable of tolerating high fluid pressures.

Another objective is to provide an orbicular valvular conduit in which different volumes of the fluid may flow through the primary flow passage and the secondary flow passage.

Another objective is to provide an orbicular valvular conduit which may be modular.

Another objective is to provide an orbicular valvular conduit which can be easily integrated into a project.

Another objective is to provide an orbicular valvular conduit which may have a straight primary flow passage.

Those skilled in the art will recognize that the first valvular conduits were manufactured in a 2D fashion, in which the fluid flow passages were milled into flat stock. In some later designs, the fluid flow passages were milled into round stock. Each conduit subunit was staggered on either side of the central flow passage, then enclosed by another piece of material bolted onto the substrate. Consequently, there were limitations on the fluid pressures that the valvular conduit could tolerate. Moreover, the path through which the fluid traveled had essentially the same volume regardless of whether the fluid traveled the central flow passage or the outer flow passage. The conventional valvular conduit is typically not modular. Therefore, if a valvular conduit with a certain number of sections is needed, it may be necessary to manufacture a valvular conduit with the desired number of subunits. The conventional valvular conduit may not be easily integrated into a project and may not have a straight central fluid flow passage, thus limiting the manner in which the conduit can be used.

In its various embodiments, the orbicular valvular conduit of the present disclosure seeks to solve the limitations of orbicular valvular conduits having the conventional designs. In contrast to the 2D valvular conduit, the orbicular valvular conduit of the disclosure may be manufactured in 3D. In the conventional 2D design, each conduit subunit revolves around the central primary flow passage. In the conventional 2D valvular conduit, however, a section of substrate material, commonly known as the "guide", separates the central primary flow passage from the outer secondary flow passage. When it is revolved around the central primary flow passage, the guide becomes free floating. To solve this problem, the orbicular valvular conduit 100 of the present disclosure connects a section of the guide 130 to the circumference of the diverging section wall 113 of the fluid diverging section 112. The connection between the guide 130 and the outer diverging section wall 113, however, blocks the outer secondary flow passage 133. This is overcome by creating at least one guide passage 131 (FIG. 2) in the guide 130. In some embodiments, the width or diameter of the guide 130 may be greater than the width or diameter of the primary flow passage 121. Accordingly, the volume of the guide passage 131 or the combined volumes of the guide passages 131 may be greater than the volume of the primary flow passage 121. This expedient may provide the secondary flow passage 133 with a greater capacity for opposing the opposing fluid stream 140 via the diverted fluid stream 142.

The conventional 2D valvular conduit typically staggers each conduit section or subunit on either side of the central primary flow passage. On the other hand, in the orbicular valvular conduit 100 of the present disclosure, each conduit subunit of the orbicular valvular conduit 100 may be identical. Accordingly, the orbicular valvular conduit 100 may have a beginning subunit, an ending subunit, and any number of identical subunits in between. Each subunit, being orbicular, can press into or thread into the next subunit. Each subunit operates independently from the others, and thus, rotational indexing is not required. This greatly simplifies the manufacturing process and assembly.

The orbicular valvular conduit 100, being round or orbicular, can be easily integrated into projects, can be completely hidden in a bored hole, can be easily threaded without excess manufacturing steps and is easier to manufacture in a tight-fitting cylinder than would be achievable using a square or rectangular design. In some embodiments, the orbicular valvular conduit 100 may have a straight primary flow passage 121, thus increasing its versatility. For example, and without limitation, in some applications, a bullet may be allowed to traverse the length of the primary flow passage 121 while limiting the fluid that follows the bullet. This expedient provides numerous benefits. When attached to a firearm, for example, many sound suppressors increase the speed of the bullet. In applications in which it is attached to a firearm for sound suppression purposes, the orbicular valvular conduit 100 would not change or minimally change the speed of the bullet. This would allow a user to use the same ballistics data in a suppressed vs an unsuppressed application Moreover, the orbicular valvular conduit 100 may enable the bullet to exit the suppressor with a much-reduced muzzle blast. This would reduce the influence of the muzzle blast on the flight of the bullet, thereby increasing the accuracy of each shot.

The conventional 2D valvular conduit typically includes one central fluid flow passage and one outer fluid flow channel. The guide 130 of the 3D orbicular valvular conduit 100 separates the central primary flow passage 121 and the outer secondary flow passage 133 and may have the capability to nest 1 or more additional guide passages 131, thus providing more restriction to the check valve function of the orbicular valvular conduit 100 and providing greater flow area for the opposing fluid stream 140.

The orbicular valvular conduit can be manufactured in a variety of ways. Each method has its strengths and weaknesses. Each method of manufacture has its own speed constraints, material constraints and complexity constraints. 1. It can be machined. 2. It can be stamped out of sheet metal, and then, although not necessary, welded. 3. It can be 3D printed.

Figure 3:
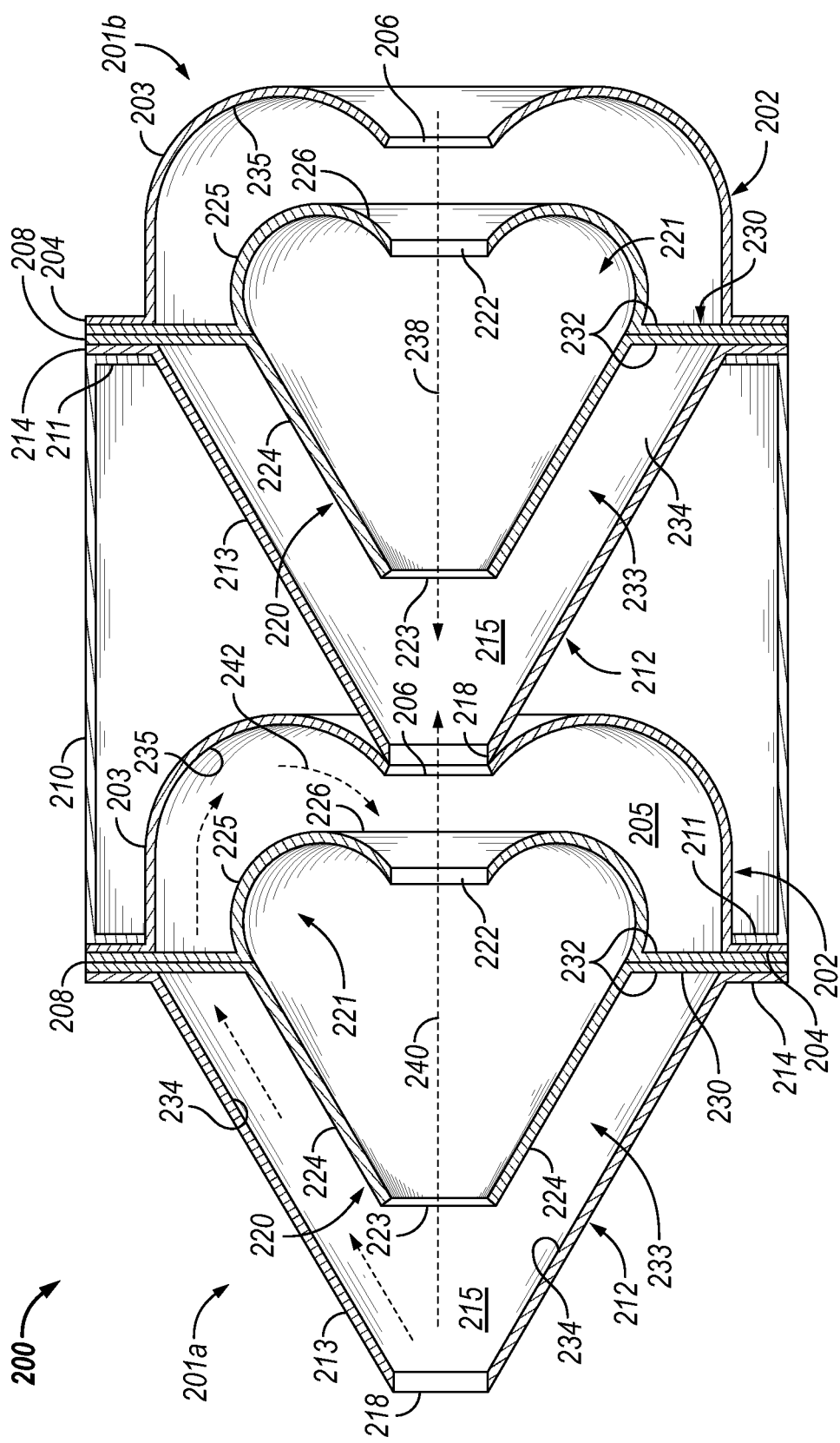
FIG. 3 is a longitudinal sectional view of an alternative illustrative embodiment of a stamped orbicular valvular conduit with a 180° cutaway.
Figure 4:
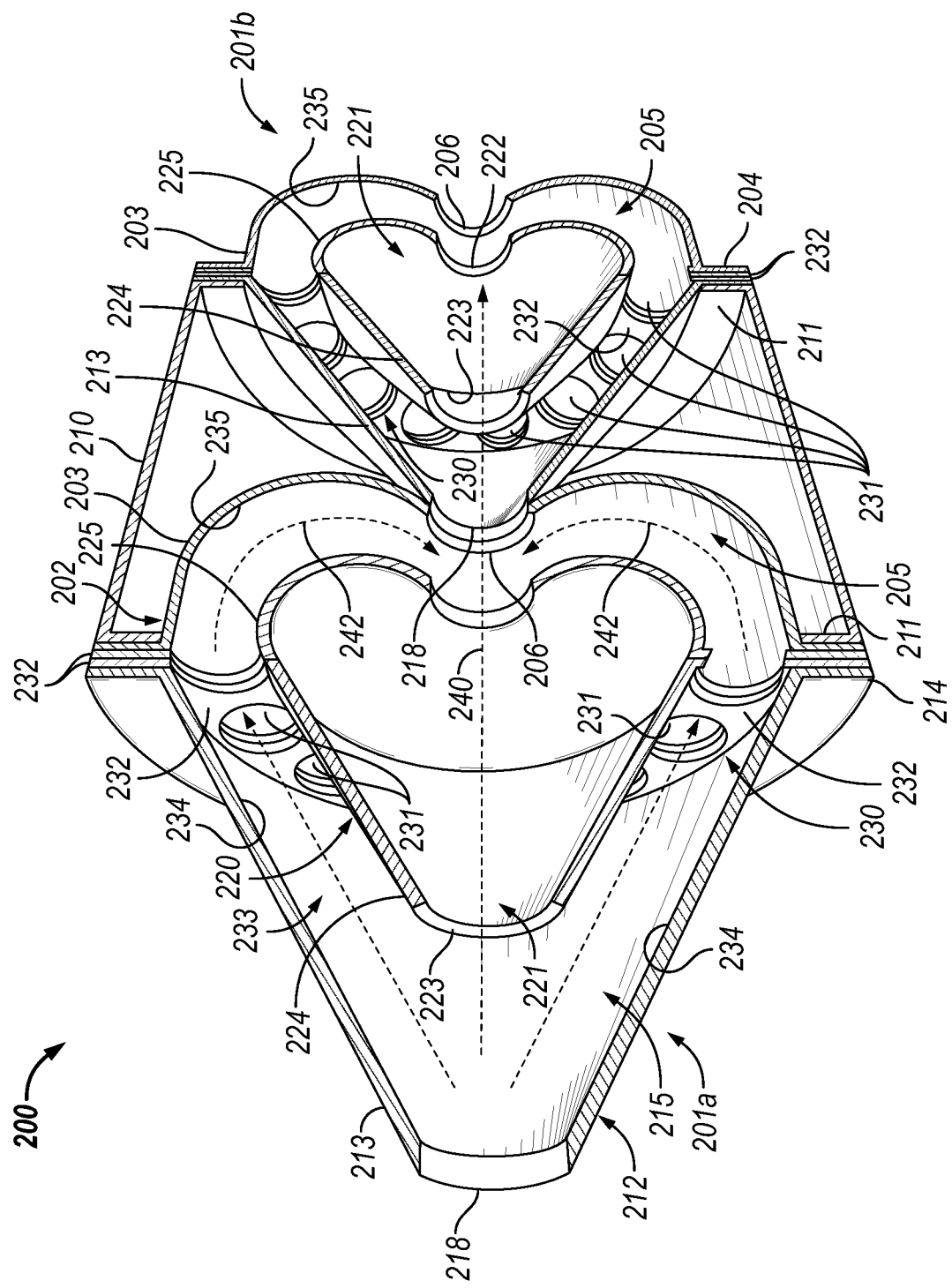
FIG. 4 is a sectioned perspective view of the stamped orbicular valvular conduit illustrated in FIG. 3, with a 180° cutaway.

Referring next to FIGS. 3 and 4 of the drawings, an alternative illustrative embodiment of a stamped orbicular valvular conduit is generally indicated by reference numeral 200. In the conduit 200, elements which are structurally and/or functionally analogous to the respective elements of the conduit 100 that was heretofore described with respect to FIGS. 1 and 2 are designated by the same respective numerals in the 200-299 series in FIGS. 3 and 4. The conduit 200 may be manufactured from individual, stamped pieces of material. After stamping, the components of the conduit 200 can be welded together, depending on manufacturer needs or specifications.

The conduit 200 may include a subunit spacer 210. In some embodiments, the subunit spacer 210 may be cylindrical. The subunit spacer 210 may contain the fluid converging section 202 of one conduit subunit 201a and the fluid diverging section 212 of the adjacently joined or connected conduit subunit 201b. A pair of housing flanges 211 may be provided at the respective opposite ends of the subunit spacer 210 for purposes which will be hereinafter described.

The fluid converging section 202 of each conduit subunit 201 may include a converging section wall 203. A converging section interior 205 may be formed by the converging section wall 203. A converging section flange 204 may extend outwardly from the converging section wall 203. A central converging section opening 206 may extend through the converging section wall 203. The converging section opening 206 communicates with the converging section interior 205.

The fluid diverging section 212 of each conduit subunit 201 may include a conical diverging section wall 213. A diverging section interior 215 may be formed by the diverging section wall 213. A diverging section flange 214 may extend outwardly from the wide end of the diverging section wall 213. A diverging section opening 218 may be provided at the narrow or tapered end of the diverging section wall 213. The diverging section opening 218 communicates with the diverging section interior 215.

In typical assembly of the conduit 200, the converging section flange 204 on the fluid converging section 202 of the conduit subunit 201a may be attached to an exterior surface of the corresponding housing flange 211 of the subunit spacer 210, with the converging section wall 203 protruding into the subunit spacer 210. In like manner, the diverging section flange 214 on the fluid diverging section 212 of the conduit subunit 201b may be attached to an exterior surface of the other housing flange 211, with the diverging section wall 213 protruding into the subunit spacer 210 toward the converging section wall 203 of the fluid converging section 202 of the conduit subunit 201a. Accordingly, the diverging section opening 218 in the fluid diverging section 212 of the conduit subunit 201b may be disposed adjacent to and in fluid communication with the diverging section opening 206 in the fluid converging section 202 of the conduit subunit 201a inside the subunit spacer 210. Conversely, the fluid diverging section 212 of the conduit subunit 201a may extend away from the corresponding fluid converging section 202 outside the subunit spacer 210, whereas the fluid converging section 202 of the conduit subunit 201b may extend away from the corresponding fluid diverging section 212 outside the subunit spacer 210.

A valve core 220 may be disposed in the diverging section interior 215 of each fluid diverging section 212 and the converging section interior 205 of each corresponding fluid converging section 202. The valve core 220 may include a conical fluid diverging wall portion 224 which forms the diverging passage segment 234 and a fluid converging wall portion 225 which curves inwardly from the fluid diverging wall portion 224 and forms the converging passage segment 235 of the secondary flow passage 233.

The primary flow passage 221 may be formed by the fluid diverging wall portion 224 and the fluid converging wall portion 225 inside the valve core 220. The primary flow passage 221 may have a passage inlet end 222 and a passage outlet end 223 at the narrow or tapered end of the fluid diverging wall portion 224. A passage inlet cavity 226 may extend from the fluid converging wall portion 225 to the passage inlet end 222 of the primary flow passage 221. As illustrated in FIG. 3, the valve core interior 221 may form a primary flow passage for a primary fluid stream 238.

A guide flange 232 may extend circumferentially outwardly from each of the fluid diverging wall portion 224 and the fluid converging wall portion 225 of the valve core 220. Accordingly, in both the conduit subunit 201a and the conduit subunit 201b of the assembled conduit 200, the guide flanges 232 of the respective fluid diverging wall portion 224 and fluid converging wall portion 225 may be disposed against each other. In the conduit subunit 201a, the diverging section flange 214 of the fluid diverging section 212 may be disposed against the guide flange 232 on the fluid diverging wall portion 224 of the valve core 220. The guide flange 232 of the fluid converging wall portion 225 of the valve core 220 may be sandwiched between the converging section flange 204 on the converging section wall 203 of the fluid converging section 202 and the guide flange 232 on the fluid diverging wall portion 224 of the valve core 220.

In the conduit subunit 201b of the assembled conduit 200, the converging section flange 204 of the fluid converging section 202 may be disposed against the guide flange 232 on the fluid converging wall portion 225 of the valve core 220. The guide flange 232 on the fluid diverging wall portion 224 of the valve core 220 may be sandwiched between the diverging section flange 214 on the diverging section wall 213 of the fluid diverging section 212 and the guide flange 232 on the fluid converging wall portion 225 of the valve core 220.

In attachment of each of the conduit subunits 201a, b to the subunit spacer 210, the section interface 208 may be formed by the diverging section flange 214 of the fluid diverging section 212, the guide flanges 232 of the respective fluid diverging wall portion 224 and fluid converging wall portion 225, the converging section flange 204 of the fluid converging section 202 and the corresponding housing flange 211 of the subunit spacer 210, which may be stacked and attached to each other using welding, mechanical fasteners and/or other suitable techniques known by those skilled in the art. As illustrated in FIG. 4, the stacked and attached flanges may collectively form the guide 230 which spaces and separates the valve core 220 from the diverging section wall 213 of each corresponding fluid diverging section 212 and the converging section wall 203 of the fluid converging section 202. The guide passages 231 may extend through the guide flanges 232 of the guide 230 to establish fluid communication between the converging passage segment 235 and the diverging passage segment 234 of the secondary flow passage 233. The diverging passage segment 234 of the secondary flow passage 233 is formed by and between the fluid diverging wall portion 224 of the core 220 and the diverging section wall 213 of the fluid diverging section 212. The converging passage segment 235 of the secondary flow passage 233 is formed by and between the fluid converging wall portion 225 of the valve core 220 and the converging section wall 203 of the fluid converging section 202.

Application of the conduit 200 may as be heretofore described with respect to the conduit 100 in FIGS. 1 and 2. The primary flow passage 221 in the valve core 220 facilitates flow of fluid in the primary fluid stream 238 while resisting or limiting an opposing fluid stream 240 in the opposite direction. Under circumstances in which the opposing fluid stream 240 flows against the primary fluid stream 238, the diverted fluid stream 242 diverges from the opposing fluid stream 240 and travels first along the diverging passage segment 234 and then along the converging passage segment 235 of the secondary flow passage 233, joining the primary fluid stream 238 and flowing through the primary flow passage 221 such that the opposing fluid stream 240 is impeded.

The various components including the diverging section wall 213, the fluid diverging wall portion 224, the fluid converging wall portion 225, the converging section wall 203 and the subunit spacer 210 may be stamped parts. The primary flow passage 221 in the valve core 220 may serve as an expansion chamber. Accordingly, the primary flow passage 221 may enable high pressure gases in the primary fluid stream 238 to expand, thereby decreasing flow of the fluid in the opposing fluid stream 240. The hot gases in the primary fluid stream 238 typically have little or no effect on expansion in the primary flow passage 221.

Referring next to FIGS. 5-8 of the drawings, another alternative illustrative embodiment of a stamped orbicular valvular conduit is generally indicated by reference numeral 300. In the conduit 300, elements which are structurally and/or functionally analogous to the respective elements of the conduit 200 that was heretofore described with respect to FIGS. 3 and 4 are designated by the same respective numerals in the 300-399 series in FIGS. 5-8. The conduit 300 may be manufactured from individual, stamped pieces of material. After stamping, the components of the conduit 300 can be welded together, depending on manufacturer needs or specifications.

In each of the conduit subunits 301a, 301b of the conduit 300, an outer valve core 320 may be disposed in the diverging section interior 315 of the diverging section 320. An outer secondary flow passage 333, having an outer diverging passage segment 334 and an outer converging passage segment 335, may be formed by and between the outer valve core 320 and the diverging section wall 313 of the diverging section 312. The outer converging passage segment 335 of the outer secondary flow passage 333 may communicate with the passage inlet end 322 of a primary flow passage 321 in the outer valve core 320. The outer diverging passage segment 334 of the outer secondary flow passage 333 may communicate with the passage outlet end 323 of the primary flow passage 321.

An inner valve core 346 may be disposed in the outer valve core 320. An inner secondary flow passage 353, having an inner diverging passage segment 354 and an inner converging passage segment 355, may be formed by and between the inner valve core 346 and the outer valve core 320. The inner converging passage segment 355 of the inner secondary flow passage 353 may communicate with the passage outlet end 348 of a primary flow passage 347 in the inner valve core 346. The inner diverging passage segment 354 of the inner secondary flow passage 353 may communicate with the passage outlet end 348 of the primary flow passage 347. The primary flow passage 321 of the outer valve core 320 communicates with the primary flow passage 347 of the inner valve core 346 through the passage inlet end 348 of the primary flow passage 347.

Figure 8:
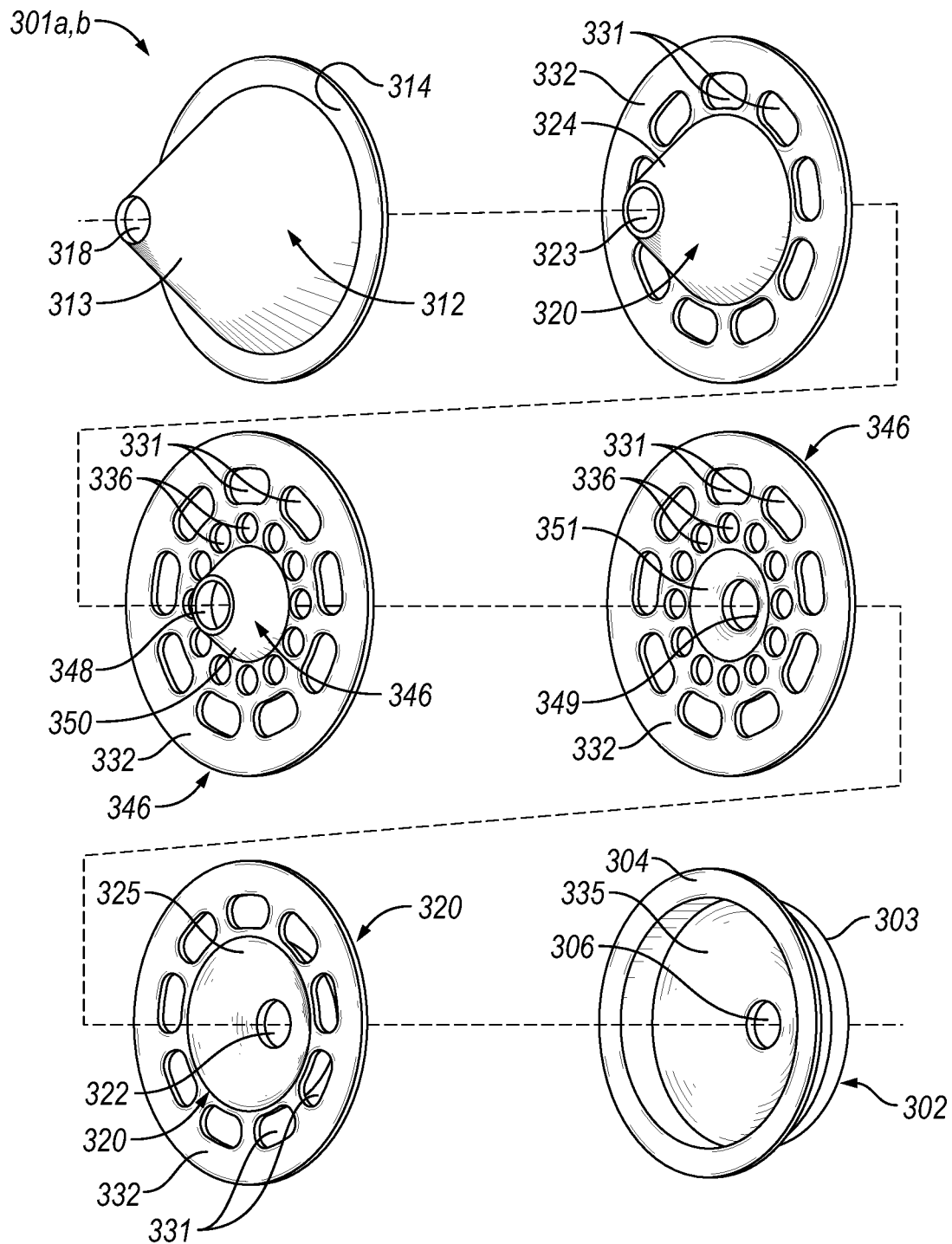
FIG. 8 is an exploded perspective view of a typical conduit subunit of the orbicular valvular conduit illustrated in FIGS. 5-7.

An exploded perspective view of a typical conduit subunit 301a, b of the orbicular valvular conduit 300 is illustrated in FIG. 8. The diverging section 312 of each conduit subunit 301a, b may include a diverging section flange 314 which extends circumferentially outwardly from the wide end of the conical diverging section wall 313, opposite the diverging section opening 318. The converging section 302 may include a converging section flange 304 which extends circumferentially outwardly from the converging section wall 303 opposite the converging section opening 306.

The outer valve core 320 may include a guide flange 332 which extends circumferentially outwardly from the wide end of the outer conical fluid diverging wall portion 324. Multiple outer guide passages 331 may extend through the guide flange 332. A guide flange 332 may likewise extend circumferentially outwardly from the outer fluid converging wall portion 325 of the outer valve core 320. Multiple outer guide passages 331 may extend through the guide flange 332.

The inner valve core 346 may include a guide flange 332 which extends circumferentially outwardly from the inner fluid diverging wall portion 350 and a guide flange 332 which in like manner extends from the inner fluid converging wall portion 351. Multiple outer guide passages 331 may extend through the guide flange 332 of each of the inner fluid diverging wall portion 350 and the inner fluid converging wall portion 351. Multiple inner guide passages 336 may extend through each guide flange 332 inside the outer guide passages 331.

In typical assembly of the conduit 300, the converging section flange 304 on the converging section 302 of the conduit subunit 301a may be attached to the exterior surface of the housing flange 311 of the subunit spacer 310. The guide flange 332 on the outer fluid converging wall portion 325 of the outer valve core 320 may be attached to the converging section flange 304. The guide flange 332 on the inner fluid converging wall portion 351 of the inner valve core 346 may be attached to the guide flange 332 on the outer fluid converging wall portion 325 of the outer valve core 320.

Figure 6:
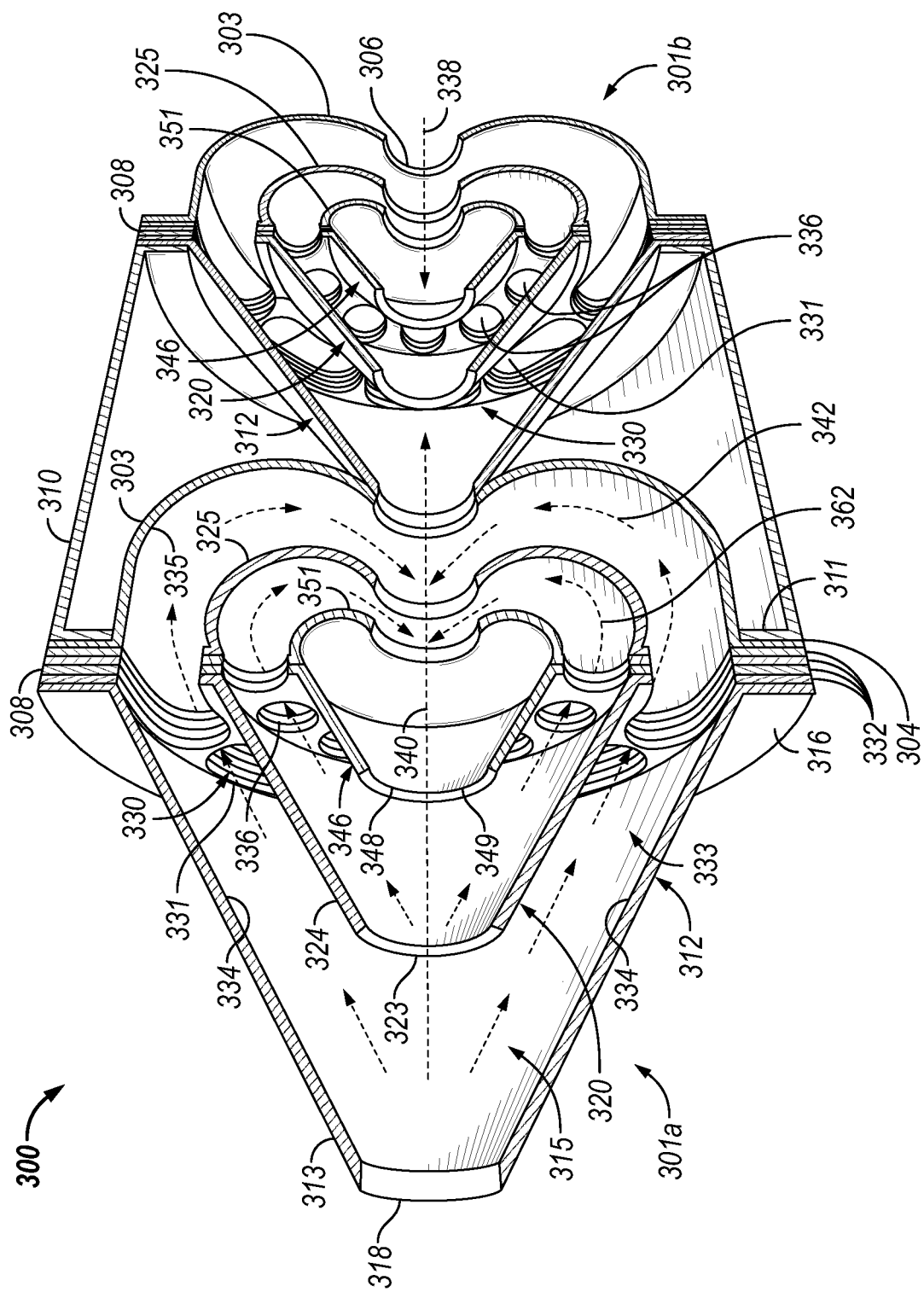
FIG. 6 is a sectioned perspective view of the stamped orbicular valvular conduit illustrated in FIG. 5, with a 180° cutaway.
Figure 7:
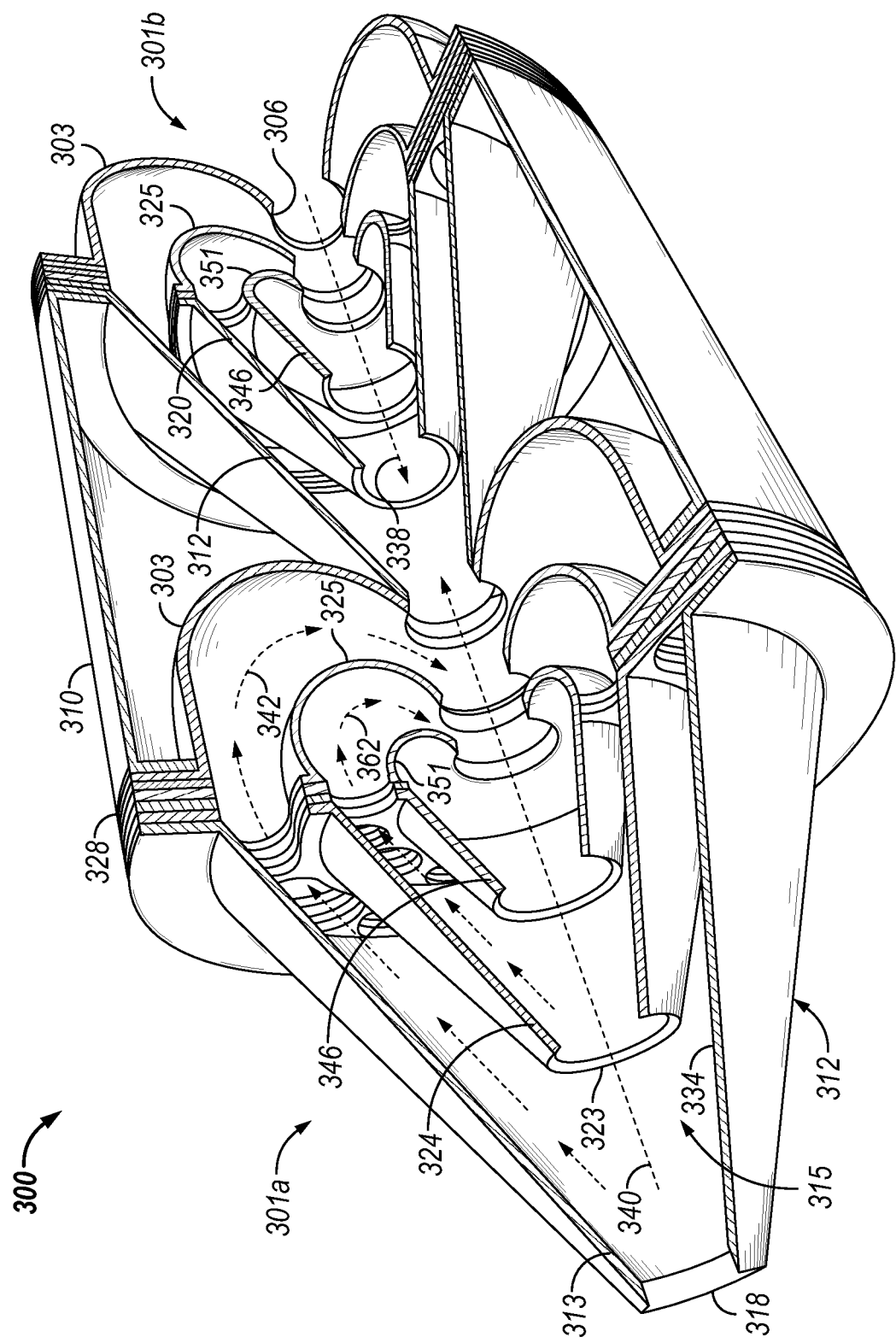
FIG. 7 is a sectioned perspective view of the stamped orbicular valvular conduit illustrated in FIG. 5, with a 90° cutaway.

As further illustrated in FIG. 8, the guide flange 332 on the inner fluid diverging wall portion 350 of the inner valve core 346 may be attached to the guide flange 332 on the inner fluid converging wall portion 351 of the inner valve core 346 to complete the inner valve core 346. The guide flange 332 on the outer fluid diverging wall portion 324 of the outer valve core 320 may be attached to the guide flange 332 on the inner fluid diverging wall portion 350 of the inner valve core 346. Finally, the diverging section flange 314 on the diverging section wall 313 of the diverging section 312 may be attached to the guide flange 332 on the outer fluid diverging wall portion 324 of the outer valve core 320 to complete assembly of the conduit subunit 301a on the subunit spacer 310, with the flanges welded, fastened and/or otherwise attached to each other at the section interface 308. During assembly, the outer guide passages 331 in the guide flanges 332 of the respective outer fluid diverging wall portion 324, inner fluid diverging wall portion 350, inner fluid converging wall portion 351 and outer fluid converging wall portion 325 may be disposed in registering relationship to each other. Likewise, the inner guide passages 336 in the guide flanges 332 of the respective inner fluid diverging wall portion 350 and inner fluid converging wall portion 351 may be disposed in registering relationship to each other. As illustrated in FIG. 6, the stacked and attached flanges may collectively form the guide 330 which spaces and separates the outer valve core 320 from the diverging section wall 313 of each corresponding fluid diverging section 312 and the converging section wall 303 of the converging section 302, and also separates the inner valve core 346 from the outer valve core 320. The guide passages 331 may extend through the guide flanges 332 of the guide 330 to establish fluid communication between the converging passage segment 335 and the diverging passage segment 334 of the secondary flow passage 333.

Figure 5:
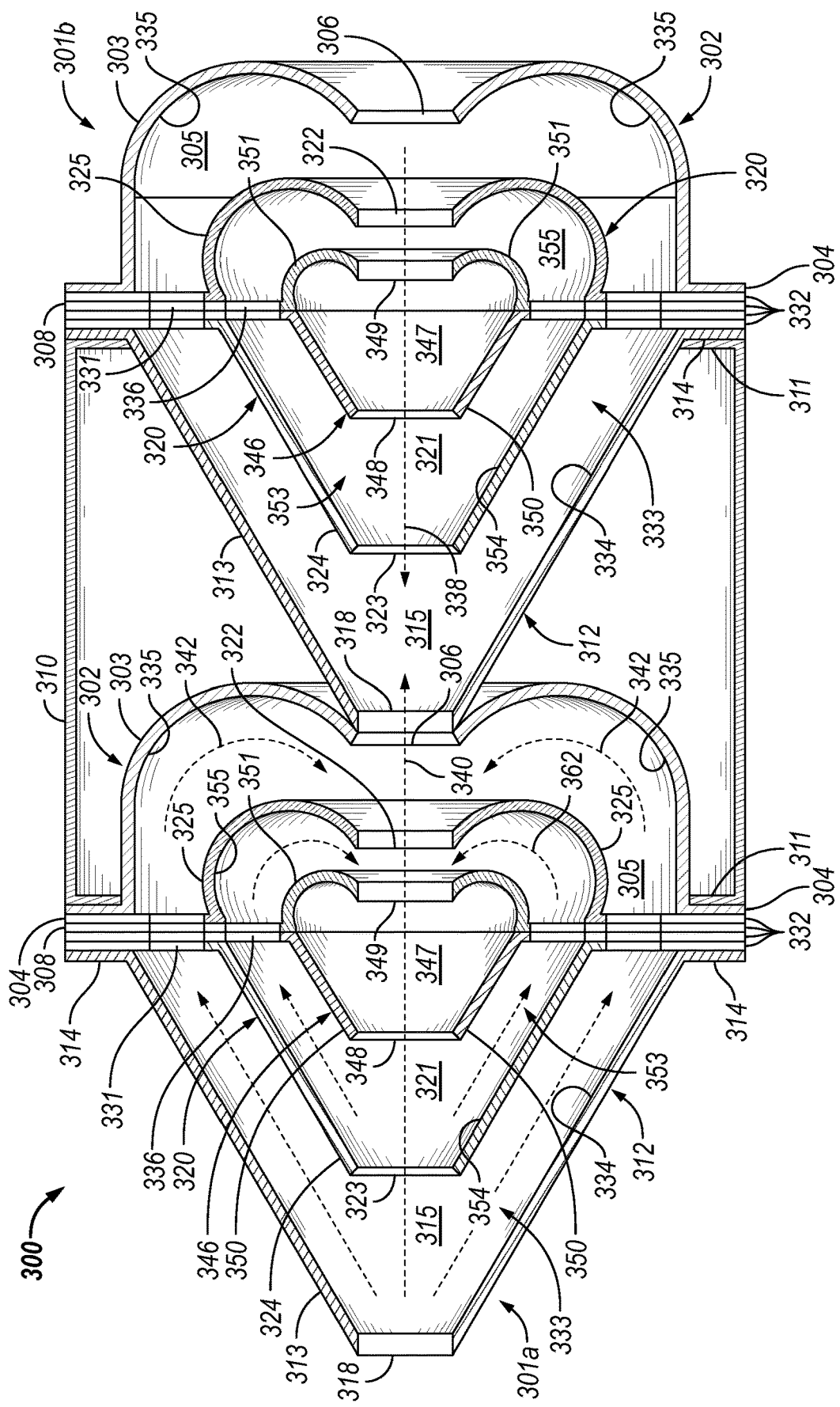
FIG. 5 is a longitudinal sectional view of another alternative illustrative embodiment of a stamped orbicular valvular conduit with a 180° cutaway.

The conduit subunit 301b may be assembled on the opposite end of the subunit spacer 310 in reverse order. Accordingly, as illustrated in FIGS. 5 and 6, the diverging section opening 318 in the diverging section wall 313 of the diverging section 312 of the conduit subunit 301b may be disposed adjacent to and in fluid communication with the converging section opening 306 in the converging section wall 303 of the converging section 302 of the conduit subunit 301a in the subunit spacer 310.

Application of the conduit 300 may be similar to that which was heretofore described with respect to the conduit 200 in FIGS. 3 and 4. The primary flow passage 321, 347 in the outer valve core 320 and inner valve core 346 facilitates flow of fluid in the primary fluid stream 338 while resisting or limiting an opposing fluid stream 340 in the opposite direction. Under circumstances in which the opposing fluid stream 340 flows against the primary fluid stream 338, an outer diverted fluid stream 342 may diverge from the opposing fluid stream 340 and travel along the outer diverging passage segment 334 and the outer converging passage segment 335 of the outer secondary flow passage 333, joining the primary fluid stream 338 and flowing through the primary flow passage 321, 347 such that the opposing fluid stream 340 is impeded. Simultaneously, an inner diverted fluid stream 362 may diverge from the opposing fluid stream 340 and travel along the inner diverging passage segment 354 and the inner converging passage segment 355 of the inner secondary flow passage 353, also joining the primary fluid stream 338 and flowing through the primary flow passage 321, 347 and further impeding the opposing fluid stream 340.

The various components including the diverging section wall 313, the outer fluid diverging wall portion 324, the outer fluid converging wall portion 325, the inner fluid diverging wall portion 350, the inner fluid converging wall portion 351 and the subunit spacer 310 may be stamped parts. The primary flow passage 321 in the outer valve core 320 and the primary flow passage 347 in the inner valve core 346 may each serve as an expansion chamber. Accordingly, the primary flow passage 321, 347 may enable high pressure gases in the primary fluid stream 338 to expand, thereby decreasing flow of the fluid in the opposing fluid stream 340. The hot gases in the primary fluid stream 338 typically have little or no effect on expansion in the primary flow passage 321, 347.

Referring next to FIGS. 9-12 of the drawings, a single conduit subunit 401 of an illustrative embodiment of a 3D printed orbicular valvular conduit 400 is illustrated. In the conduit 400, elements which are structurally and/or functionally analogous to the respective elements of the conduit 100 that was heretofore described with respect to FIGS. 1 and 2 are designated by the same respective numerals in the 400-499 series in FIGS. 9-12. The conduit 400 may be manufactured using a 3D printer. Manufacture of the conduit 400 using a 3D printer may afford numerous advantages such as, for example, fabrication from a single piece of material; optimization of the density of the conduit 400 depending on the structural requirements of the conduit 400; and fabrication in ways that traditional parts cannot be machined.

Figure 9:
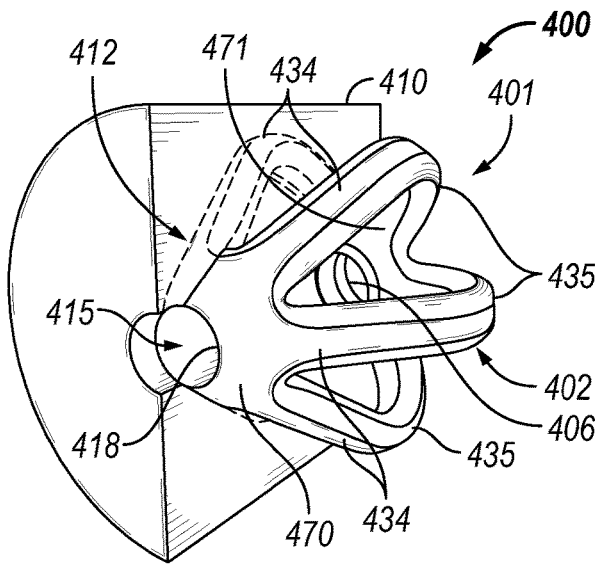
FIGS. 9-12 are perspective views of a single conduit subunit of an illustrative embodiment of a 3D printed orbicular valvular conduit.
Figure 10:
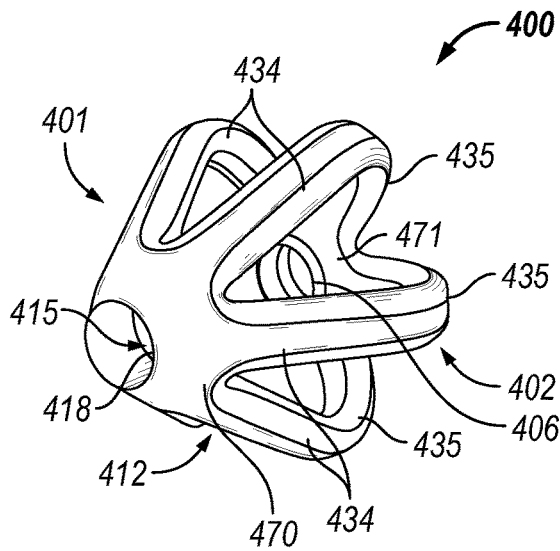
Figure 11:
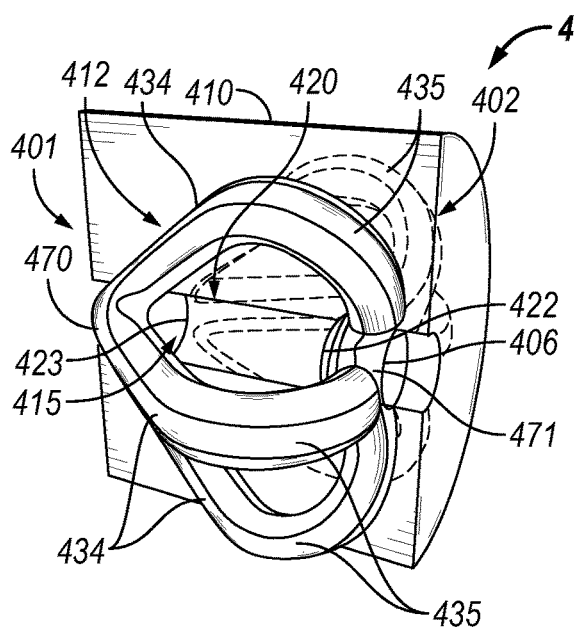
Figure 12:
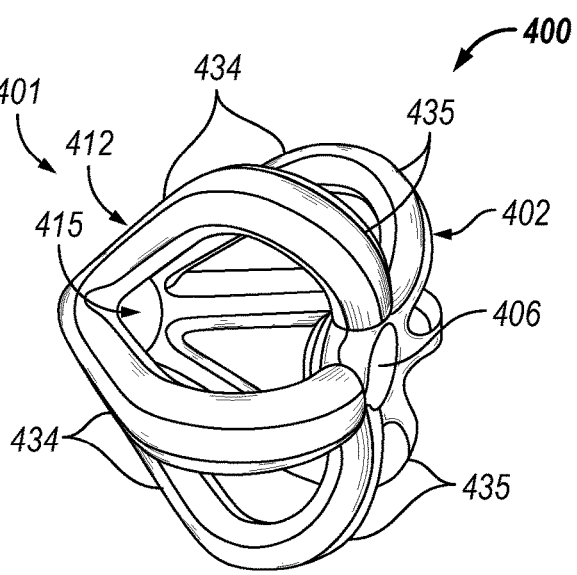
Figure 13:
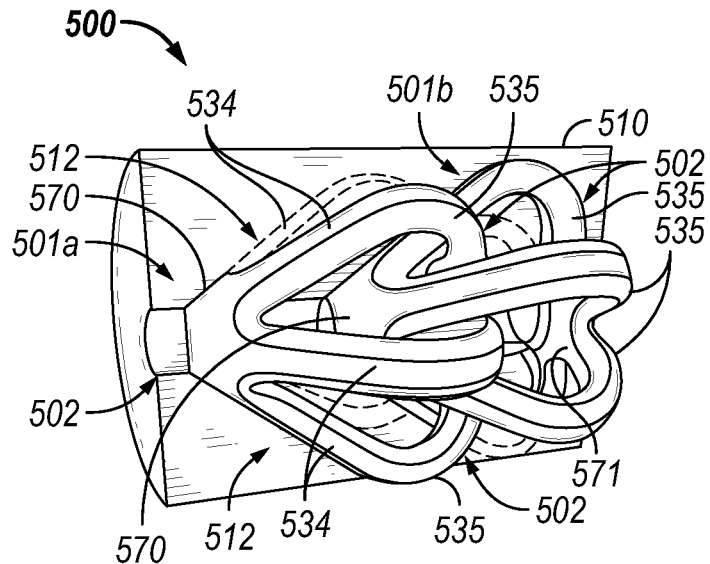
FIGS. 13-16 are perspective views of a pair of mating conduit subunits of the illustrative 3D printed orbicular valvular conduit illustrated in FIGS. 9-12.
Figure 14:
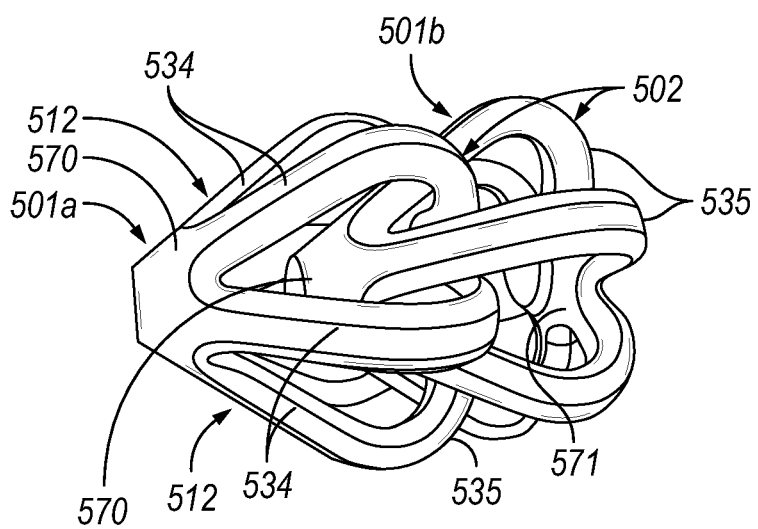
Figure 15:
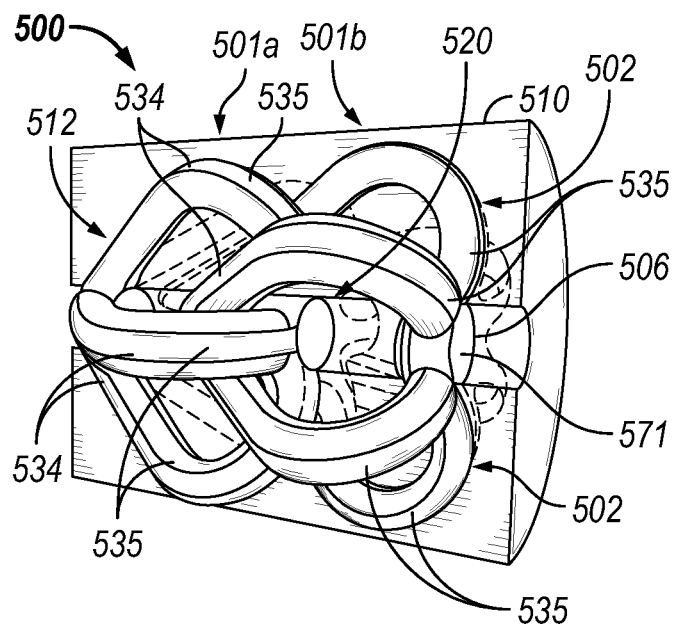
Figure 16:
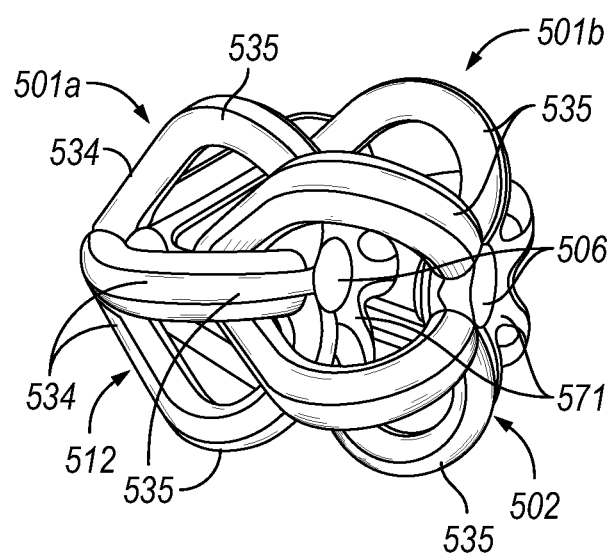

As illustrated in FIGS. 9 and 11, in some embodiments, the conduit 400 may include a conduit housing 410. In some embodiments, the conduit housing 410 may be cylindrical, as illustrated. Each conduit subunit 401 may include a fluid diverging section 412. A fluid converging section 402 may extend from the fluid diverging section 412.

The fluid diverging section 412 may include a diverging arm connecting portion 470. A plurality of diverging passage arms 434 may angle rearwardly from the fluid diverging section 412. The diverging passage arms 434 may correspond structurally and functionally to the diverging passage segment 134 of the secondary flow passage 133 in the fluid diverging section 112 of the conduit 100 which was heretofore described with respect to FIGS. 1 and 2.

The fluid converging section 402 may include a plurality of converging passage arms 435 which extend from the respective diverging passage arms 434 of the fluid diverging section 412. The converging passage arms 435 may converge from the diverging passage arms 434 and terminate on and in fluid communication with a converging arm connecting portion 471. The converging passage arms 435 may correspond structurally and functionally to the converging passage segment 135 (FIG. 1) of the secondary flow passage 133 in the fluid converging section 102 of the conduit 100.

As illustrated in FIG. 11, a valve core 420 may extend between the diverging arm connecting portion 470 of the fluid diverging section 412 and the converging arm connecting portion 471 of the fluid converging section 402. The valve core 420 may be an elongated pipe or conduit having a core inlet end 422 disposed in fluid communication with the converging arm connecting portion 471 and a core outlet end 423 disposed in fluid communication with the diverging arm connecting portion 470. The valve core 420 may correspond structurally and functionally to the valve core 120 having the primary flow passage 121 of the conduit 100 heretofore described with respect to FIG. 1.

Application of the conduit 400 may as be heretofore described with respect to the conduit 100 in FIGS. 1 and 2. Accordingly, one or multiple conduit subunits 401 may be disposed in fluid communication with each other and with a pipe or other conduit (not illustrated) which conveys a fluid at the respective converging section opening 406 in the fluid converging section 402 and diverging section opening 418 in the fluid diverging section 412. The valve core 420 accommodates the primary fluid stream, whereas the diverging passage arms 434 and the converging passage arms 435 accommodate the respective diverted fluid streams from any opposing fluid stream which may backflow in the valve core 420. The diverted fluid streams flow from the diverging arm connecting portion 470 first through the diverging passage arms 434 and then through the converging passage arms 435 into the converging arm connecting portion 471, and then join the primary fluid stream as the primary fluid stream flows from the core inlet end 422 to the core outlet end 423 of the valve core 420, thereby counteracting and impeding the opposing fluid stream.

Referring next to FIGS. 13-16 of the drawings, a pair of mating conduit subunits 501a, 501b of the illustrative 3D printed orbicular valvular conduit 400 illustrated in FIGS. 9-12 is generally indicated by reference numeral 500. In the conduit 500, elements which are structurally and/or functionally analogous to the respective elements of the conduit 400 that was heretofore described with respect to FIGS. 9-12 are designated by the same respective numerals in the 500-599 series in FIGS. 13-16. In the conduit 500, the valve cores 520 of the conduit subunits 501a, 501b are disposed in fluid communication with each other. The diverging passage arms 534 and converging passage arms 535 of the conduit subunit 501a may be overlapped with respect to and intertwined with the diverging passage arms 534 and converging passage arms 535 of the conduit subunit 501b. Accordingly, the overlapping and intertwined conduit subunits 501a, 501b may provide additional points along the primary fluid stream in the valve cores 520 for the diverting fluid streams 142 to enter the fluid diverting sections 512 and fluid converging sections 502 and re-enter the primary fluid stream, thus amplifying the capability in counteracting and impeding any opposing fluid stream or streams which may develop in the valve core 520.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An orbicular valvular conduit, comprising:
   at least one conduit subunit including:
   a fluid diverging section having a conical diverging section wall and a diverging section interior formed by the diverging section wall;
   a fluid converging section including a converging section wall having a curved profile in cross-section extending from the diverging section wall of the fluid diverging section, a converging section interior formed by the converging section wall and a converging section opening extending through the converging section wall and communicating with the converging section interior, the converging section opening establishing fluid communication between the converging section interior of the fluid converging section and the diverging section interior of the fluid diverging section, the fluid converging section configured to mate with a fluid diverging section of an adjacent conduit subunit at a section interface;
a conical valve core disposed in the diverging section interior of the fluid diverging section, a primary flow passage extending centrally through the valve core, the primary flow passage having a passage inlet end and a passage outlet end, the passage outlet end of the primary flow passage disposed proximate the converging section opening of the fluid converging section, a fluid diverting surface extending outwardly from the passage outlet end of the primary flow passage, a fluid converging surface having a curved profile in cross-section and extending from the fluid diverging surface and an annular passage inlet cavity extending from the fluid converging surface and terminating at the passage inlet end of the primary flow passage;
a conical secondary flow passage formed by and between the diverging section wall of the fluid diverging section and the fluid diverting surface of the valve core, the secondary flow passage having a diverging passage segment extending along the fluid diverging surface and a converging passage segment extending along the fluid converging surface, the primary flow passage of the valve core disposed in fluid communication with the converging passage segment of the secondary flow passage through the passage inlet cavity; and
at least one guide disposed in the secondary flow passage and at least one guide passage extending through the guide, the guide passage establishing fluid communication between the converging passage segment and the diverging passage segment of the secondary flow passage.

2. The orbicular valvular conduit of claim 1, wherein the at least one conduit subunit is machined from a single piece of material.

3. The orbicular valvular conduit of claim 1, further comprising a converging section flange along an outer edge or rim of the converging section wall and a diverging section flange along an outer edge or rim of the diverging section wall, the diverging section flange on the fluid diverging section configured to mate with the converging section flange on the fluid converging section of an adjacent conduit subunit at a section interface to couple the conduit subunits to each other.

4. The orbicular valvular conduit of claim 1, wherein the fluid converging section, the fluid diverging section and the valve core of the at least one conduit subunit is fabricated of plastic, aluminum, stainless steel, titanium, or combinations thereof.

5. The orbicular valvular conduit of claim 1, wherein the at least one guide passage in the at least one guide follows an arc of the secondary flow passage.

6. The orbicular valvular conduit of claim 1, wherein the at least one guide passage is a circular or elongated hole.

7. The orbicular valvular conduit of claim 1, wherein a combined volume of the at least one guide passage is greater than a combined volume of the primary flow passage.

8. An orbicular valvular conduit, comprising:
a conduit housing having a first housing end and a second housing end;
a first conduit subunit at the first housing end and a second conduit subunit at the second housing end of the conduit housing, each of the first conduit subunit and the second conduit subunit including:
a fluid diverging section having a conical diverging section wall, a diverging section interior formed by the diverging section wall and a diverging section opening formed by the diverging section wall and communicating with the diverging section interior;
a fluid converging section including a converging section wall having a curved profile in cross-section, a converging section interior formed by the converging section wall and a converging section opening extending through the converging section wall and communicating with the converging section interior, the converging section wall of the fluid converging section configured to mate with the diverging section wall of the fluid diverging section at a section interface;
wherein the diverging section opening in the fluid diverging section of the second conduit subunit is disposed adjacent to and in fluid communication with the converging section opening in the fluid converging section of the first conduit subunit inside the conduit housing;
a conical valve core having a conical fluid diverting wall portion disposed in the diverging section interior of the fluid diverging section and a fluid converging wall portion having a curved profile in cross-section in the converging section interior of the fluid converging section, a primary flow passage extending centrally through the valve core, the primary flow passage having a passage inlet end and a passage outlet end, the passage inlet end of the primary flow passage disposed in fluid communication with the converging section interior of the fluid converging section and the passage outlet end of the primary flow passage disposed in fluid communication with the diverging section interior of the fluid diverging section;
a conical secondary flow passage having a diverging passage segment formed by and between the diverging section wall of the fluid diverging section and the fluid diverting wall portion of the valve core and a converging passage segment formed by and between the converging section wall of the fluid converging section and the fluid converging wall portion of the valve core, the passage inlet end of the primary flow passage of the valve core disposed in fluid communication with the converging passage segment of the secondary flow passage and the passage outlet end of the primary flow passage disposed in fluid communication with the diverging section interior of the fluid diverging section; and
at least one guide disposed in the secondary flow passage between the diverging passage segment and the converging passage segment and at least one guide passage extending through the guide, the guide passage establishing fluid communication between the converging passage segment and the diverging passage segment of the secondary flow passage.

9. The orbicular valvular conduit of claim 8, wherein the diverging section wall, the fluid diverging wall portion, the fluid converging wall portion, the converging section wall, and the conduit housing are stamped parts.

10. The orbicular valvular conduit of claim 8, wherein the conduit housing comprises a first housing flange at the first housing end and a second housing flange at the second housing end, and the first conduit subunit is attached to the first housing flange and the second conduit subunit is attached to the second housing flange.

11. The orbicular valvular conduit of claim 8, further comprising a diverging section flange extending from the diverging section wall of the fluid diverging section, a converging section flange extending from the converging section wall of the fluid converging section and a pair of guide flanges extending from the fluid diverting wall portion and the fluid converging wall portion, respectively, of the valve core and sandwiched between the diverging section flange and the converging section flange, and wherein the at least one guide is formed by the pair of guide flanges and the at least one guide passage extends through the pair of guide flanges.

12. The orbicular valvular conduit of claim 11, wherein the conduit housing comprises a first housing flange at the first housing end and a second housing flange at the second housing end, and the first conduit subunit is attached to the first housing flange and the second conduit subunit is attached to the second housing flange.

13. The orbicular valvular conduit of claim 12, wherein the converging section flange on the converging section wall of the fluid converging section of the first conduit subunit is attached to the first housing flange of the conduit housing.

14. The orbicular valvular conduit of claim 12, wherein the diverging section flange on the diverging section wall on the fluid diverging section of the second conduit subunit is attached to the second housing flange of the conduit housing.

15. The orbicular valvular conduit of claim 8, wherein the primary flow passage comprises an expansion chamber.

16. An orbicular valvular conduit, comprising:
  a conduit housing having a first housing end and a second housing end;
  a first conduit subunit at the first housing end and a second conduit subunit at the second housing end of the conduit housing, each of the first conduit subunit and the second conduit subunit including:
    a fluid diverging section having a conical diverging section wall, a diverging section interior formed by the diverging section wall and a diverging section opening formed by the diverging section wall and communicating with the diverging section interior;
    a fluid converging section including a converging section wall having a curved profile in cross-section, a converging section interior formed by the converging section wall and a converging section opening extending through the converging section wall and communicating with the converging section interior, the converging section wall of the fluid converging section configured to mate with the diverging section wall of the fluid diverging section at a section interface;
    wherein the diverging section opening in the fluid diverging section of the second conduit subunit is disposed in adjacent to and in fluid communication with the converging section opening in the fluid converging section of the first conduit subunit inside the conduit housing;
    a conical outer valve core having a conical outer fluid diverting wall portion disposed in the diverging section interior of the fluid diverging section and an outer fluid converging wall portion having a curved profile in cross-section in the converging section interior of the fluid converging section, a primary flow passage extending centrally through the outer valve core, the primary flow passage having a passage inlet end and a passage outlet end, the passage inlet end of the primary flow passage disposed in fluid communication with the converging section interior of the fluid converging section and the passage outlet end of the primary flow passage disposed in fluid communication with the diverging section interior of the fluid diverging section;
    a conical outer secondary flow passage having an outer diverging passage segment formed by and between the diverging section wall of the fluid diverging section and the outer fluid diverting wall portion of the outer valve core and an outer converging passage segment formed by and between the outer converging section wall of the outer fluid converging section and the outer fluid converging wall portion of the outer valve core, the passage inlet end of the primary flow passage of the outer valve core disposed in fluid communication with the outer converging passage segment of the outer secondary flow passage and the passage outlet end of the primary flow passage disposed in fluid communication with the diverging section interior of the fluid diverging section;
    a conical inner valve core having a conical inner fluid diverting wall portion disposed in the outer fluid diverting wall portion of the outer valve core and an inner fluid converging wall portion having a curved profile in cross-section in the outer fluid converging wall portion of the outer valve core, the primary flow passage extending centrally through the inner valve core;
    a conical inner secondary flow passage having an inner diverging passage segment formed by and between the outer fluid diverting wall portion of the outer valve core and the inner fluid diverting wall portion of the inner valve core and an inner converging passage segment formed by and between the outer fluid converging wall portion of the outer valve core and the inner fluid converging wall portion of the inner valve core, the passage inlet end of the primary flow passage disposed in fluid communication with the inner converging passage segment of the inner secondary flow passage and the passage outlet end of the primary flow passage disposed in fluid communication with the inner diverging passage segment of the inner secondary flow passage;
    at least one guide disposed in the outer secondary flow passage between the outer diverging passage segment and the outer converging passage segment;
    at least one outer guide passage extending through the guide, the at least one outer guide passage establishing fluid communication between the outer converging passage segment and the outer diverging passage segment of the outer secondary flow passage; and
    at least one inner guide passage extending through the guide, the at least one inner guide passage establishing fluid communication between the inner converging passage segment and the inner diverging passage segment of the inner secondary flow passage.

17. The orbicular valvular conduit of claim 16 wherein the diverging section wall, the outer fluid diverging wall portion, the outer fluid converging wall portion, the inner fluid diverging wall portion, the inner fluid converging wall portion and the conduit housing are stamped parts.

18. The orbicular valvular conduit of claim 16, further comprising a diverging section flange extending from the diverging section wall of the fluid diverging section, a converging section flange extending from the converging section wall of the fluid converging section, and a plurality of guide flanges extending from the outer fluid diverting wall portion and the outer fluid converging wall portion of the outer valve core, respectively, and the inner fluid diverting wall portion and the inner fluid converging wall portion, respectively, of the inner valve core and sandwiched between the diverging section flange and the converging section flange, and wherein the at least one guide is formed by the plurality of guide flanges and the at least one outer guide passage and the at least one inner guide passage extends through the plurality of guide flanges.

19. The orbicular valvular conduit of claim 18, wherein the conduit housing comprises a first housing flange at the first housing end and a second housing flange at the second housing end, and the first conduit subunit is attached to the first housing flange and the second conduit subunit is attached to the second housing flange.

20. The orbicular valvular conduit of claim 19 wherein the converging section flange on the converging section wall of the fluid converging section of the first conduit subunit is attached to the first housing flange of the conduit housing.

21. The orbicular valvular conduit of claim 19, wherein the diverging section flange on the diverging section wall on the fluid diverging section of the second conduit subunit is attached to the second housing flange of the conduit housing.

* * * * *